United States Patent [19]

Ruumpol

[11] 4,403,175
[45] Sep. 6, 1983

[54] CONTROL SYSTEM, MORE PARTICULARLY FOR DRIVING MOTORS FOR A VEHICLE FOR THE DISABLED

[75] Inventor: Geurt J. Ruumpol, Wilp, Netherlands

[73] Assignee: Inductive Control Systems, B.V., Ede, Netherlands

[21] Appl. No.: 265,364

[22] Filed: May 20, 1981

[30] Foreign Application Priority Data

May 21, 1980 [NL] Netherlands ............... 8002952

[51] Int. Cl.³ .......................................... H02P 7/68
[52] U.S. Cl. ........................................ 318/53; 318/139
[58] Field of Search ............... 318/51, 53, 59, 66, 318/139

[56] References Cited

U.S. PATENT DOCUMENTS 3,630,304 12/1971 Sahinkaya ............... 318/139 UX
3,736,480 5/1973 Lee ............................. 318/51
4,284,929 8/1981 Garrett et al. ............ 318/53 X Primary Examiner—J. V. Truhe
Assistant Examiner—W. E. Duncanson, Jr.
Attorney, Agent, or Firm—Diller, Ramik & Wight

[57] ABSTRACT

A control system, more particularly for the electric motors driving a vehicle for the disabled, comprising a control member for delivering a required speed signal which varies linearly with the position of the control member, a feed back control circuit for each motor, a power supply for the motor and the control circuits, the linear speed signal is compared with a signal selected, on the basis of the instantaneous speed of the motor, to form a number of signal which are stored in a memory, and for forming a control signal which does not vary linearly with the speed signal. The control signal is fed to the motor control circuit to keep the rotation of the motor constant.

17 Claims, 1 Drawing Figure

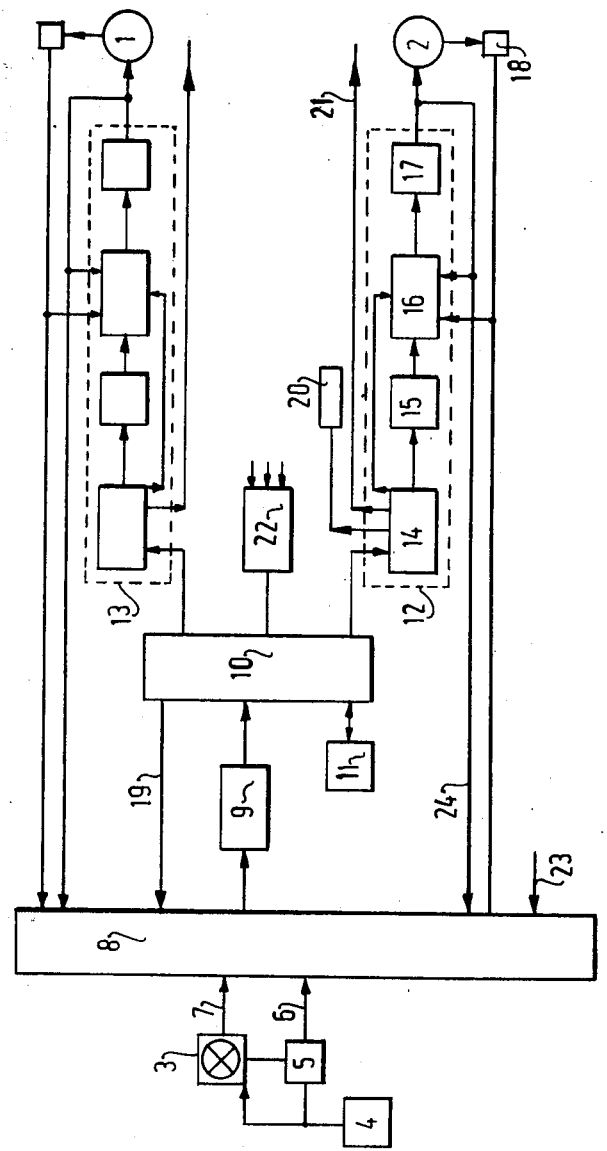

CONTROL SYSTEM, MORE PARTICULARLY FOR DRIVING MOTORS FOR A VEHICLE FOR THE DISABLED

This invention relates to a control system, more particularly for the electric motors driving a vehicle for the disabled, comprising a control member for delivering a required speed signal which varies linearly with the position of the control member, a feedback control circuit for each motor, and a power supply for the motor and the control ciruits.

The object of the invention is to improve a generally known system of this kind. To this end, the invention provides a circuit for comparing the linear speed signal with a signal selected, on the basis of the instantaneous speed of the motor, from a number of signals stored in a memory, and for forming a control signal which does not vary linearly with the speed signal, and for feeding said control signal to the motor control circuit.

Optimum vehicle operation can be obtained by these steps. Changing the information stored in the memory enables the behaviour of the vehicle to be adapted to the user. Depending upon the instantaneous speed, a change of the position of the control member produces a signal so that the control circuit changes the motor speed uniformly.

By providing motor current feedback in each control circuit the speed of rotation of the motor is kept constant irrespective of any resistance encountered by the motor. If the various motors are subjected to different loading, the speed nevertheless remains constant thus preventing the vehicle from departing from a straight line due to the wheels being driven at different speeds.

Preferably, signals proportional to the voltage at the power supply and the current delivered by the latter are fed to the comparison circuit, the signals are compared with the signals stored in the memory, and indication signals for indicating the capacity of the power supply are formed on the basis of the comparison. As a result, a distinct indication is given concerning the capacity of the power supply, thus preventing the same from being exhausted without the user's being warned during operation of the vehicle. This is very important for vehicles for the disabled, since such users are frequently unable to move the vehicle by their own power or call on others for help.

The comparison circuit forms a brake actuating signal at a speed signal equal to zero and at a motor speed signal deviating from zero. The object of this is rapidly to stop the vehicle if the user sets the control handle to the zero position. The motor can be fed by pulses, the width of which is regulated by the control circuit.

The invention is explained in detail with reference to a diagram illustrating one exemplified embodiment.

The motors 1 and 2 may, for example, drive the wheels of a vehicle for the disabled. The required speed and direction of movement of the vehicle are indicated by means of the control handle 3. Handle 3 can be moved in every direction in one plane. The amount of movement from the neutral middle position indicates the required speed and the quadrant in which the movement takes place indicates the required direction of the vehicle. The control member 3 may comprise a central coil fed by an oscillator 4, and a number of receiving coils (not shown), in which the induced voltage represents the distance from the movable coil core connected to the control handle. The quadrant in which the core is situated is determined by phase comparison, in phase comparator 5, between the phase of the voltage induced in the receivers and the coil supply voltage. The output of the phase comparator 5 and the magnitude of the voltage induced in the receivers and representing the required speed is fed as a signal 6 and 7 to the multiplex circuit 8. The speed signal 7 is of linear type, i.e. its variation is proportional to the amount of movement of the control handle from the neutral position. The multiplex circuit 8 passes the signals to an analog-digital converter 9. The output of the latter is fed to the central processing unit 10. The latter is coupled to a memory 11. It should be noted that the circuits 10 and 11 may be formed by a microprocessor. The memory 11 may be an ROM for example. Two control circuits 12 and 13 are connected to the output of the central processing unit 10. The two control circuits are basically similar in construction and each consists of a gate 14, a digital-analog converter 15, a pulse-width modulator 16, and an amplification output stage 17. The controlled motor is coupled to the latter stage. Each motor is coupled by its output to a speed recorder 18 which may be optical, inductive or the like. The current supplied to the motor is fed back to the pulse-width modulator 16, and the same applies to the motor speed signal. The effect of this feedback is that the motor will always have the same speed irrespective of the resistance it encounters. The motor current and the motor speed signal are also fed back to the multiplex circuit 8 which feeds the signals back to the central processing unit 10 via the analog-digital converter 9. The signals offered by the multiplex circuit are interrogated one by one at set times by means of a command 19 by the central processing unit. From the measured motor current the central processing unit can determine that there is an exceptional situation. In order then to protect the motor, a signal can be fed via the gate 14 to the motor current protection relay 20. The current to the motor can thus be switched off. The central processing unit also forms a braking signal which actuates the brake 21 via the gate 14. The input gates 22 are also connected to the central processing unit 10 and enable any selection signals to be input. A selection signal of this kind may, for example, be a slow/quick signal, direction indicator signals, and the like. The central processing unit 10 can determine the remaining capacity of the power supply 23 from its voltage and the motor current signal 24. An indication signal can be formed if the capacity does not reach a specific minimum. An indicator lamp, for example, can be lit by means of the indication signal.

What we claim is:

1. A control system, more particularly for the electric motors driving a vehicle for the disabled, comprising a control member for delivering a required speed signal which varies linearly with the position of the control member, a feed back control circuit for each motor, and a power supply for the motor and the control circuits, characterised by a circuit for comparing the linear speed signal with a signal selected, on the basis of the instantaneous speed of the motor, from a number of signals stored in a memory, and for forming a control signal which does not vary linearly with the speed signal, and for feeding said control signal to the motor control circuit.

2. A control system according to claim 1, characterised in that each control circuit comprises a motor current feedback.

3. A control system according to claim 1, characterised in that signals proportional to the voltage at the power supply and the current delivered by the latter are fed to the comparison circuit, the signals are compared with the signals stored in the memory, and indication signals for indicating the capacity of the power supply are formed on the basis of the comparison.

4. A control system according to claim 1, characterised in that the comparison circuit forms a brake actuating signal at a speed signal equal to zero and at a motor speed signal deviating from zero.

5. A control system according to claim 1, characterised in that the motor is fed by pulses, the width of which is regulated by the control circuit.

6. A control system according to claim 2, characterized in that signals proportional to the voltage at the power supply and the current delivered by the latter are fed to the comparison circuit, the signals are compared with the signals stored in the memory, and indication signals for indicating the capacity of the power supply are formed on the basis of the comparison.

7. A control system according to claim 6, characterized in that the comparison circuit forms a brake actuating signal at a speed signal equal to zero and at a motor speed signal deviating from zero.

8. A control system according to claim 2, characterized in that the comparison circuit forms a brake actuating signal at a speed signal equal to zero and at a motor speed signal deviating from zero.

9. A control system according to claim 3, characterized in that the comparison circuit forms a brake actuating signal at a speed signal equal to zero and at a motor speed signal deviating from zero.

10. A control system according to claim 2, characterized in that the motor is fed by pulses, the width of which is regulated by the control circuit.

11. A control system according to claim 3, characterized in that the motor is fed by pulses, the width of which is regulated by the control circuit.

12. A control system according to claim 6, characterized in that the motor is fed by pulses, the width of which is regulated by the control circuit.

13. A control system according to claim 4, characterized in that the motor is fed by pulses, the width of which is regulated by the control circuit.

14. A control system according to claim 7, characterized in that the motor is fed by pulses, the width of which is regulated by the control circuit.

15. A control system according to claim 8, characterized in that the motor is fed by pulses, the width of which is regulated by the control circuit.

16. A control system according to claim 9, characterized in that the motor is fed by pulses, the width of which is regulated by the control circuit.

17. In a battery powered vehicle used by handicapped persons, which vehicle includes a pair of wheel-driving motors and a control member of the joy stick type having a predetermined maximum throw from the neutral position and means associated with the control member to produce control member position signals for said motors which are proportional to the throw and quadrant position of the control member, the improvement which comprises control circuit means connecting said control member position signals to said motors for selectively altering the responses of said motors to said control member in accord with the physical capabilities of the handicapped person using the vehicle.

* * * * *